United States Patent [19]
Hofverberg

[11] Patent Number: 5,434,806
[45] Date of Patent: Jul. 18, 1995

[54] APPARATUS AND METHOD FOR RANDOM NUMBER GENERATION

[75] Inventor: Mikael N. Hofverberg, Kungsängen, Sweden

[73] Assignee: Telefonaktiebolaget LM Ericsson, Stockholm, Sweden

[21] Appl. No.: 178,255
[22] PCT Filed: May 11, 1993
[86] PCT No.: PCT/SE93/00414
§ 371 Date: Jan. 11, 1994
§ 102(e) Date: Jan. 11, 1994
[87] PCT Pub. No.: WO93/23804
PCT Pub. Date: Nov. 25, 1993

[30] Foreign Application Priority Data
May 12, 1992 [SE] Sweden .................. 9201498

[51] Int. Cl.⁶ ............................... G06F 1/02
[52] U.S. Cl. ................................. 364/717
[58] Field of Search .......................... 364/717; 380/46; 331/78

[56] References Cited

U.S. PATENT DOCUMENTS

| | | |
|---|---|---|
| 3,700,869 | 10/1972 | Low et al. |
| 3,781,473 | 12/1973 | Goode et al. |
| 4,847,800 | 7/1989 | Daane ...................... 364/717 |
| 4,905,176 | 2/1990 | Schulz . |
| 4,974,184 | 11/1990 | Avra ........................ 364/717 |
| 5,079,733 | 1/1992 | Antoine et al. |
| 5,105,376 | 4/1992 | Pedron ..................... 364/717 |
| 5,325,201 | 6/1994 | Herz ........................ 364/717 |

FOREIGN PATENT DOCUMENTS 066768 12/1982 European Pat. Off. .
377241 7/1990 European Pat. Off. .
388131 9/1990 European Pat. Off. .

OTHER PUBLICATIONS

"Integrated Circuit Compatible Random Number Generator" *IBM Technical Disclosure Bulletin*, vol. 30, No. 11, pp. 333–335 (Apr. 1988).

J. Saarinen et al., "VLSI Implementation of Tausworthe Random Number Generator for Parallel Processing Environment" *IEEE Proceedings-E*, vol. 138, No. 3, pp. 138–146 (May 1991).

*Primary Examiner*—Tan V. Mai
*Attorney, Agent, or Firm*—Burns, Doane, Swecker & Mathis

[57] ABSTRACT

An apparatus and a method for random number generation. The apparatus includes a feedback shift register which receives signals from a first signalling device, the shift register further being connected to a t least one delay device. This or these delay device(s) deliver (each) a random number when receiving a clock signal from a second sigalling device. The first signalling device includes a fast clock and the feedback shift register is connected to the delay device(s) via at least one logical gate, the output(s) of delay device(s) being fed back to the gate(s), the second signalling device delivering clock signals originating from external events.

17 Claims, 2 Drawing Sheets

APPARATUS AND METHOD FOR RANDOM NUMBER GENERATION

BACKGROUND

The present invention relates to an apparatus for random number generation comprising a feedback shift register which receives signals from a first signalling device, the feedback shift register being connected to at least one clocked delay device which upon receiving a clock signal from a second signalling device produces a random number. Such devices find their use within e.g. radiocommunication, for production of crypto-keys etc. The requirements are that random numbers, both random numbers produced by one and the same apparatus as well as random numbers produced by different apparatuses are as uncorrected and unpredictable as possible.

There is furthermore often a need of a random number generator which may be integrated in an LSI (Large Scale Integration)-circuit.

An apparatus of the abovementioned kind is given by U.S. Pat. No. 4,905,176. In this known apparatus On-Chip noise- sources are used as a first signalling device. Such On-Chip noise sources are both difficult and expensive to fabricate. Moreover they consume much current. Furthermore the random numbers which are generated by this apparatus do not originate from external events but depend on parameters of the LSI such as for example material and constitution, the circumstances prevailing at its fabrication and so on. Since the random numbers come directly from the outputs of a large PN-register, different apparatuses which are started up and driven simultaneously will generate the same random number. Moreover, different inputs from the same PN sequence are used as the input to the logical gate (XOR). A further inconvenience with this apparatus is that the random numbers merely can be obtained in series and not in parallel.

In other known apparatuses noise diodes are used which generate noise which is amplified and quantified. In this manner generated random numbers are read by a computer. Random number generators of this kind require a large number of discrete and integrated components and it is furthermore not possible to integrate the whole random number generator in an LSI. Furthermore these apparatuses require high voltages, such as approximately 20 V as well as high currents, e.g. more than 50 mA.

SUMMARY

It is an object of the present invention to provide an apparatus for generation of random numbers which give as good and uncorrelated random numbers as possible, and wherein different apparatuses produce different random numbers. It is furthermore an object of the invention to provide an apparatus which does not require high currents and which only requires a low voltage. Preferably the apparatus consumes less than 1 mA and merely requires about 5 V. A further object of the invention is to provide a random number generator which is entirely digital, easy to integrate, particularly in an LSI, and which can be fabricated in a cheap way and by cheap components.

These objects as well as others are achieved through an apparatus of the aforementioned kind wherein the first signalling device comprises a fast clock, the feedback shift register is connected to the delay device/devices via at least one logical gate, the output(s) delay device(s) further being fed back to said gate/gates, and wherein clocking signals from the second signalling device originate from external events.

It is also an object of the invention to provide a method for generation of random numbers by which the foregoing mentioned objects are achieved.

The objects are achieved through a method wherein a random number generated by one apparatus is independent of a random number simultaneously generated by another apparatus, wherein a PN-register receives a clocking signal from a first signalling device, the PN-register being connected to at least one delay device, preferably a D-flip-flop which from a second signalling device receives an asynchronous, external signal and which thereupon produces a random number, wherein the data entrance of the delay device is connected to the PN-register via a logical gate, preferably an XOR-gate, the output from the delay device furthermore being fed back to the XOR-gate(s), and the fast clock delivering signals with a clocking frequency $f_1$ which essentially exceeds the clocking frequency $f_2$ of the second signalling device and in parallel delivering clock signals to the delay devices from the second signalling device.

The feedback shift register preferably comprises a so called PN-register, i.e. Pseudo-Noise-register. This PN-register particularly receives signals from the first signalling device comprised by a fast clock. Particularly this fast clock has a clocking frequency which is so high that the PN-register manages to wraparound between each clock signal delivered by the second signalling device which produces signals for the delay device(s). For an 18-bit PN-register the frequency may according to a preferred embodiment e.g. be about 1 MHz. In this case the register wraps around about four times per second. Preferably the logical gate/gates are so called XOR-gates. Particularly, the output thereof is connected to the data-input of a D-type flip-flop the Q-output of which in turn is fed back to the logical gate. Through a feedback coupling of this kind the random number will depend on what has happened in the preceding step which in turn depends on the preceding step etc.

According to a preferred embodiment the apparatus comprises a number of clocked delay devices $d_i$ ($i=1, \ldots, n$) connected in parallel for parallel generation of ($i=1, \ldots, n$) random numbers. Particularly at least a number of bit positions of the feedback shift register may be connected each to a separate logical gate, the ouput of each logical gate being connected to a separate clocked delay device, especially a D-type flip-flop, furthermore each delay device or D-flip-flop being fed back to its respective logical gate (XOR-gate) and the delay devices being parallel connected to the second signalling device for obtaining external, asynchronous signals. These signals come from external events from outside the apparatus, for example from the keyboard of the computer, if the keyboard is seen as an external device or through the RS-232-interface or similar. It may also be an asynchronus communication with other units or similar; it being essential that the signals originate from external events. A random number is produced which differs from one apparatus to another apparatus even if it is produced simultaneously. The apparatus is more particularly so constructed that it easily can be integrated in an LSI-circuit.

DESCRIPTION OF THE DRAWINGS

The invention will in the following be further described by reference to the accompanying drawings, which are given for explanatory, by no means limiting, purposes, wherein.

DETAILED DESCRIPTION

Figure 1:
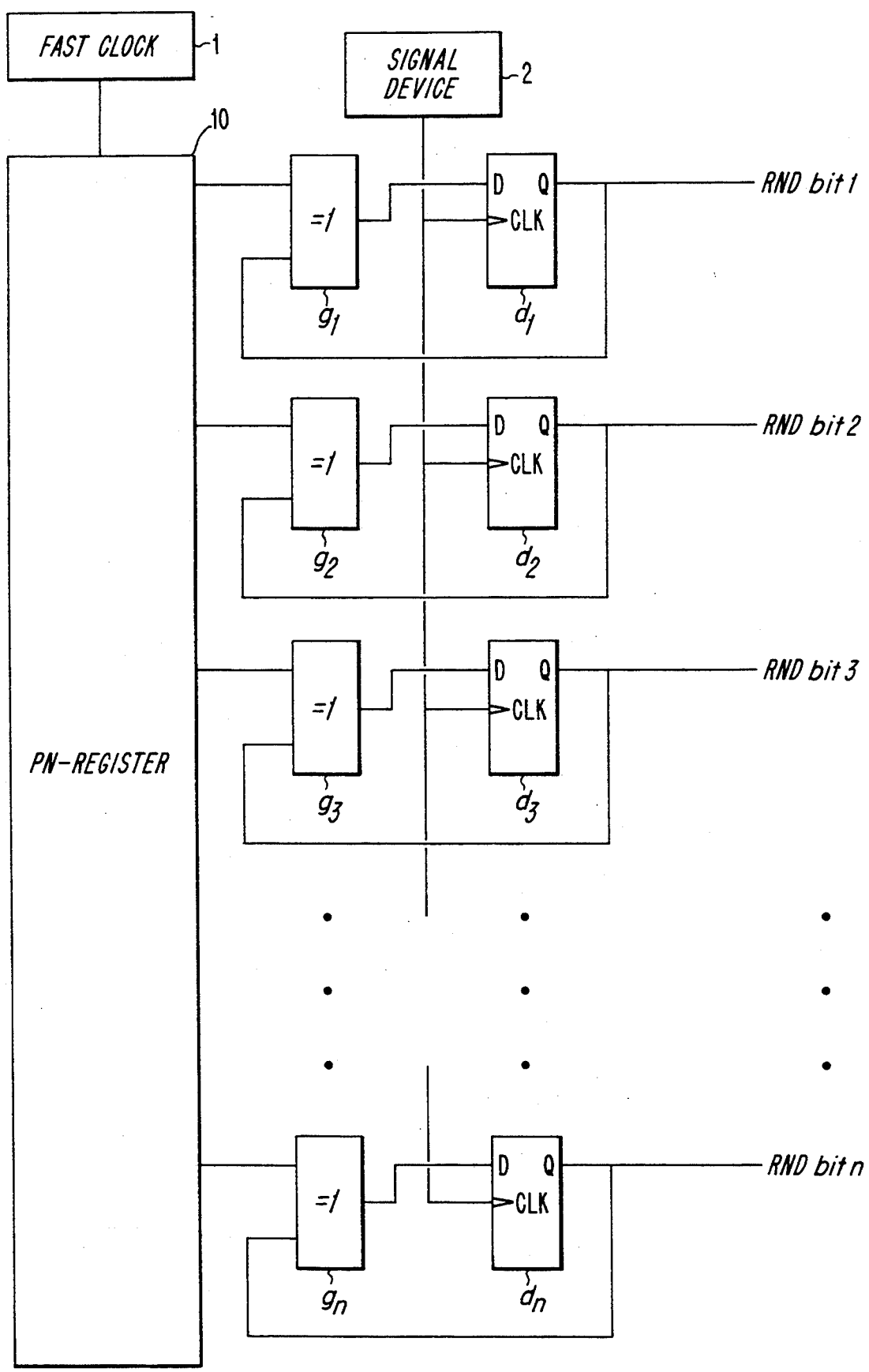
FIG. 1 shows a block diagram of an apparatus for parallel generation of a number of random numbers according to the invention.

The apparatus for random number generation according to FIG. 1 comprises a feedback PN-shift register 10. This PN-register receives signals from a fast clock 1. In the shown embodiment each bit position in the PN-register 10 is connected an XOR-gate ($g_1$, $g_2$, .., $g_n$). The output of each XOR-gate($g_1$, ..., $g_n$) is connected to the data-input D of a delay device ($d_1$, .., $d_n$). The "Q"-output (non-inverting) of the delay device ($d_1$, ..., $d_n$), e.g. a D-flip-flop is fed back via a feedback loop to the corresponding logical gate ($g_1$, .., $g_n$n). The D-flip-flops or delay devices $d_1$, ..., $d_n$ are connected in parallel to a second signalling device 2 from which they receive an asynchronous, external signal. The events or signals from this second signalling device 2 originate from external, asynchronus events taking place outside the apparatus for random number generation itself. These events may e.g. come from asynchronus communication with other units, through the RS-232-interface etc. Since the frequency of the first signalling device 1, i.e. the fast clock is so high that the PN-register 10 manages to wraparound at least once between each signal from the second signalling device 2, to the greatest extent uncorrelated random numbers i, i=1, 2, ..., n ) (RND bit 1, RND bit 2, ..., RND bit n) are obtained at the Q-output of the respective D-flip-flops $d_1$, ..., $d_n$. If an 18-bit PN-register is used, the clocking frequency of the fast clock on the first signalling device 1 may be around 1 MHz which would mean that the PN-register wraps around about four times a second. The delay devices $d_1$, ..., $d_n$ (the D-flip-flops) produce a random number each time a signal is received from the second signalling device 2. Since the events delivered from the second signalling device have an external origin i.e. come from outside the probability that two arrangements comprising an apparatus for random number generation would generate the same random number is minimal.

Figure 2:
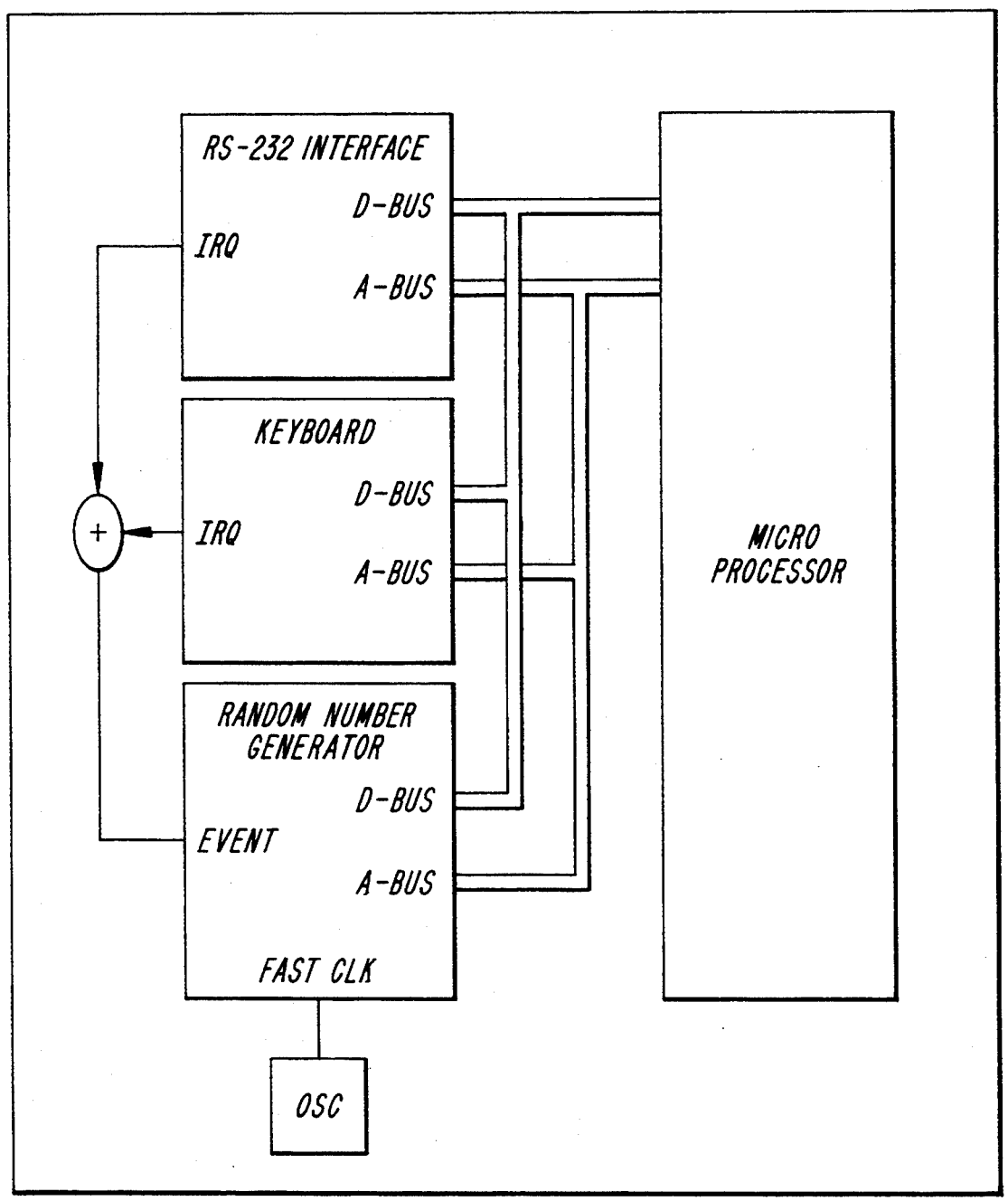
FIG. 2 shows a system comprising an apparatus for generation of random numbers according to the invention.

In FIG. 2 an example of a system comprising an apparatus for random number generation according to the invention is shown, the random numbers being fed to a micro processor with a number of external interfaces, a keyboard and a random number generator, D-bus meaning data-bus and A-bus meaning address-bus. The IRQ-signals (interruption request) from the external interface and the keyboard generate a signal "event" which was described above. The fast clock is for example generated by an external oscillator, osc.

The invention shall of course not be limited to the shown embodiments but can be freely varied within the scope of the claims, for example it is possible to, for certain applications, merely have one delay device and one gate respectively for obtaining one random number whereas in other applications a number of parallel random numbers are required. Furthermore the PN-register does not necessarily have to be an 18-bit register etc.

What is claimed is:

1. An apparatus for generating random numbers comprising:
    first and second signalling devices;
    at least one clocked delay device; and
    a feedback shift register which receives signals from the first signalling device and which is connected to the at least one clocked delay device,
    wherein the at least one clocked delay device, upon receiving a clock signal from the second signalling device, produces a random number, the first signalling device comprises a fast clock, the feedback shift register is connected to the at least one clocked delay device via at least one logical gate, an output of the at least one clocked delay device is fed back to an input of the at least one logical gate, the clock signals from the second signalling device are produced in response to events external to the apparatus, and the fast clock produces a clock signal having a frequency that exceeds a frequency of the clock signals from the second signalling device.

2. The apparatus of claim 1, wherein the clock signals from the second signalling device are produced in response to asynchronous external events.

3. The apparatus of claim 1, wherein the feedback shift register comprises a PN-register.

4. The apparatus of claim 3, wherein the at least one logical gate comprises an XOR-gate.

5. The apparatus of claim 4, wherein the at least one clocked delay device comprises a D-type flip-flop.

6. The apparatus of claim 5, wherein a data input of the at least one clocked delay device is connected to the feedback shift register via an XOR-gate, an output of the delay device is connected to an XOR-gate via a feedback loop, and the second signalling device delivers parallel clocking signals to a plurality of the clocked delay devices.

7. The apparatus of claim 1, comprising a plurality of clocked delay devices connected in parallel for generating a plurality of random numbers in parallel.

8. The apparatus of claim 7, wherein each of a plurality of bit-positions of the feedback shift register is connected to a respective logical gate, an output of each logical gate is connected to a respective clocked delay device, an output of each clocked delay device is fed back to an input of its respective logical gate, and the clocked delay devices are connected in parallel to the second signalling device for receiving signals produced in response to asynchronous external events.

9. The apparatus of claim 8, wherein the fast clock has a clocking frequency $f_1$ that exceeds a clocking frequency $f_2$ of the second signalling device, whereby the feedback shift register wraps around at least once between two consecutive clock signals from the second signalling device.

10. The apparatus of claim 9, wherein the feedback shift register is an 18-bit PN-register and $f_1$ is about one megahertz.

11. The apparatus of claim 8, wherein the feedback shift register, first signalling device, at least one clocked delay device, and at least one logical gate are integrated in an LSI circuit.

12. The apparatus of claim 8, wherein a data input of the at least one clocked delay device is connected to the feedback shift register via an XOR-gate, an output of the clocked delay device is connected to an XOR-gate via a feedback loop, and the second signalling device delivers parallel clocking signals to a plurality of the clocked delay devices.

13. The apparatus of claim 1, wherein the fast clock has a clocking frequency $f_1$ that exceeds a clocking frequency $f_2$ of the second signalling device, whereby the feedback shift register wraps around at least once between two consecutive clock signals from the second signalling device.

14. The apparatus of claim 1, wherein the feedback shift register, first signalling device, at least one clocked delay device, and at least one logical gate are integrated in an LSI circuit.

15. A method for generating random numbers, whereby a random number generated by one apparatus is independent of a random number simultaneously generated by another apparatus, each apparatus comprising a PN-register that receives a clocking signal from a first signalling device and that is connected to a delay device, the delay device receiving from a second signalling device an asynchronous external signal and thereupon producing a random number, comprising the steps of:

connecting a data input of the delay device to the PN-register via a logical gate;

feeding an output from the delay device back to an input of the logical gate; and delivering signals from the first signalling device with a clocking frequency $f_1$ that exceeds a clocking frequency $f_2$ of signals delivered from the second signalling device.

16. The method of claim 15, wherein $f_1$ is so high that the PN-register wraps around at least once in a time between each signal delivered from the second signalling device.

17. The method of claim 15, wherein each apparatus comprises a plurality of delay devices, and the method further comprises the step of delivering clock signals to the delay devices from the second signalling device in parallel.

* * * * *